US008169661B2

(12) United States Patent
Ho et al.

(10) Patent No.: US 8,169,661 B2
(45) Date of Patent: May 1, 2012

(54) METHOD AND SYSTEM FOR SCANNING PAPERS AND DOCUMENTS PRESENTING PRINTED INFORMATION IN BLACK & WHITE AND IN COLORED FORMATS

(76) Inventors: Shu-Kunag Ho, Carlisle, MA (US); Zhonghui Xiao, Chelmsford, MA (US)

( * ) Notice: Subject to any disclaimer, the term of this patent is extended or adjusted under 35 U.S.C. 154(b) by 551 days.

(21) Appl. No.: 12/313,587

(22) Filed: Nov. 21, 2008

(65) Prior Publication Data
US 2009/0147282 A1 Jun. 11, 2009

Related U.S. Application Data

(60) Provisional application No. 61/004,390, filed on Nov. 27, 2007.

(51) Int. Cl.
*H04N 1/60* (2006.01)
*H04N 1/46* (2006.01)
*H04N 1/04* (2006.01)
*G06T 7/00* (2006.01)
*G06F 15/00* (2006.01)

(52) U.S. Cl. .......... 358/1.9; 358/505; 358/474; 358/2.1; 358/448; 358/451; 382/165

(58) Field of Classification Search .................. 358/1.9, 358/2.1, 448, 451, 452, 453, 462, 474, 505; 347/2, 3; 382/165; 345/589
See application file for complete search history.

(56) References Cited

U.S. PATENT DOCUMENTS

| 5,296,939 | A | * | 3/1994 | Suzuki .......................... 358/453 |
| 5,734,390 | A | * | 3/1998 | Sakaizawa et al. ............... 347/2 |
| 6,839,151 | B1 | * | 1/2005 | Andree et al. .................. 358/2.1 |
| 6,889,012 | B2 | * | 5/2005 | Morimoto ........................ 399/2 |
| 7,177,462 | B2 | * | 2/2007 | Hirota et al. .................. 382/162 |
| 7,466,455 | B2 | * | 12/2008 | Boesten et al. ............. 358/3.21 |
| 2003/0133090 | A1 | * | 7/2003 | Kato ............................. 355/133 |
| 2004/0105582 | A1 | * | 6/2004 | Boesten et al. ............. 358/3.21 |
| 2007/0018995 | A1 | * | 1/2007 | Koyanagi et al. ............. 345/589 |
| 2008/0259409 | A1 | * | 10/2008 | Nishizawa .................... 358/448 |

\* cited by examiner

*Primary Examiner* — Kimberly A Williams
(74) *Attorney, Agent, or Firm* — David Prashker, Esq.

(57) ABSTRACT

The present invention is a scanning method and system in which the colored information as well as the black & white information appearing on the individual page or upon multiple pages of a document are initially scanned in a full color, 24-bit per pixel, mode; after which, the black & white wording and/or images are then selectively identified and electronically downsized to a single bit per pixel value. This sequence of selective identification and electronic downsizing of the black & white scanned contents effectively preserves the original printed information, while retaining the accuracy and integrity of the characters forming the colored written text and illustration portions of the scanned page or document in their original 24-bit per pixel format. Via this method and system, the entirety of the scanned image is maintained as a single electronic file of markedly reduced size.

4 Claims, 3 Drawing Sheets

Flow Chart A: Building the Color Table where n is the number of pixels of a color image;
C is the color table;
N is the number of unique colors in the color table;
j is the current pixel ($1<=j<=n$), $R_j$, $G_j$, $B_j$ are three color components (red, green and blue); and
i is the current color ($1<=i<=N$), $R_i$, $G_i$, $B_i$ are three color components (red, green and blue).

scanned color image | the grid | divided evenly | mark each cell color or black-white | merge colored cells

Flow Chart B:

Table 1:

| Description | $A_{MmM}$ | $A_{RmG}$ | $A_{RmB}$ | $A_{GmB}$ | Image |
|---|---|---|---|---|---|
| 1. A scanned print-out | 12.062552 | 6.742786 | 7.892222 | 9.490095 |  |
| 2. Image file contains 16,777,216 color | 127.998047 | 85.332031 | 85.332031 | 85.332031 |  |
| 3. A scanned newspaper | 14.213281 | 5.109693 | 12.350517 | 10.966352 |  |
| 4. A scanned PC Magazine page | 79.622361 | 27.867344 | 72.937921 | 58.439458 |  |
| 5. Flower photo | 45.866340 | 33.319833 | 33.770236 | 24.642611 |  |

METHOD AND SYSTEM FOR SCANNING PAPERS AND DOCUMENTS PRESENTING PRINTED INFORMATION IN BLACK & WHITE AND IN COLORED FORMATS

PRIORITY CLAIM

The present invention was first filed as U.S. Provisional Patent Application Ser. No. 61/004,390 on Nov. 27, 2007. The priority and legal benefit of this first filing is expressly claimed herein.

BACKGROUND OF THE INVENTION

Multi-function peripherals (or "MFPs") are machines that combine several different technologies to provide an all-in-one electronic device that is capable of printing, copying, faxing, and scanning individual papers and multi-page documents. Thus, when using the scanning capability and function of a conventional MFP device, the user is typically given two choices: (a) the user can choose to scan the page or document in a color mode; or (b) the user can choose to scan the page or document in a black & white mode.

The Problem

It is commonplace now, however, that many individual pages and multi-page documents present a combination of both colored and black & white printed information. Typically, the printed information includes visual images such as pictures, charts, and graphs which appear on the page surface in every known color and hue; while the written text of the printed information appearing as words and numbers usually (but certainly not always) is presented in black & white characters. Furthermore, given the current common usage of commercially available word processing programs and document editing software, the inclusion of edited wording and annotated language appears in any of several different colored fonts concurrently on the page; and the frequent replacement or revision of multi-colored images upon one or more pages has long since become the norm.

It has been long recognized that conventionally available techniques employed to date for the scanning of individual pages or multi-page documents in a full color mode generate an electronic file size that is several orders of magnitude larger than the electronic file size for the same page or document when scanned in the black & white mode. This difference in electronic file size for scanning the same document occurs because the color scan mode codes each pixel using three (3) bytes of color information, or twenty four (24) bits per pixel. In comparison, black & white scans use only one (1) bit per pixel—i.e., the pixel is electronically coded as being either white or black.

Thus as merely one example, for a ten page standard letter-sized document (each page measuring 8.5 by 11 inches) which is scanned in the color mode in 200 dot-per-inch (DPI), the resulting electronic file size is calculated as: [10 pages]×[200×200 dots (pixels) per inch]×[8.5 inches×11 inches]×[24 bits per pixel]=897,600,000 bits, or 897.6 Meg bits in size. In contrast, the electronic file size for that same ten page document when conventionally scanned in the black & white mode is calculated to be: [10 pages]×[200×200 dpi]×[8.5 inches×11 inches]×[1 bit per pixel]=37,4000,000, bits, or 37.4 Meg bit. The difference in electronic file sizes is both substantial and noteworthy.

Accordingly, there is a recurring difficulty when a document contains both color pages and black & white pages, or an individual page presents one or more sections that contain both black & white and color informational contents. In these instances, scanning the entire page or document in the full color mode will generate electronic files of a very large size. However, if the black & white content of the written texts and images which are scanned as 24-bit pages in the color mode could subsequently be selectively identified and individually converted into a single bit-per-pixel format, then a tremendous savings in electronic file size for that scanned document could be obtained.

SUMMARY OF THE INVENTION

The present invention has multiple aspects.

A first aspect of the present invention provides a method for electronically scanning and storing the contents of a page having a colored portion and a black & white portion of printed matter as an electronic file of markedly reduced size, said scanning method comprising the steps of:

scanning the printed matter contents of the page in a 24-bit per pixel mode;

selectively identifying which is the colored portion and which is the black & white portion of said scanned printed matter contents;

downsizing said selectively identified black & white portion of said scanned printed matter contents to a single bit per pixel format;

retaining said selectively identified colored portion of said scanned printed matter contents in said 24-bit per pixel mode; and maintaining said single bit per pixel format black & white portion with said 24-bit per pixel mode colored portion as an electronic file of markedly reduced size.

A second aspect of the present invention provides an electronic image processing system able to electronically scan and store the contents of a page having a colored portion and a black & white portion of printed matter as an electronic file of markedly reduced size, said electronic image processing system comprising:

means for electronically scanning the printed matter contents of the page in a 24-bit per pixel mode;

means for selectively identifying which is the colored portion and which is the black & white portion of said scanned printed matter contents;

means for downsizing said selectively identified black & white portion of said scanned printed matter contents to a single bit per pixel format;

means for retaining said selectively identified colored portion of said scanned printed matter contents in said 24-bit per pixel mode; and means for maintaining said single bit per pixel format black & white portion with said 24-bit per pixel mode colored as an electronic file of markedly reduced size.

BRIEF DESCRIPTION OF THE FIGURES

The present invention may be easier understood and more readily appreciated when taken in conjunction with the accompanying Drawing, in which.

DETAILED DESCRIPTION OF THE INVENTION

I. The Present Invention

Figure 1:
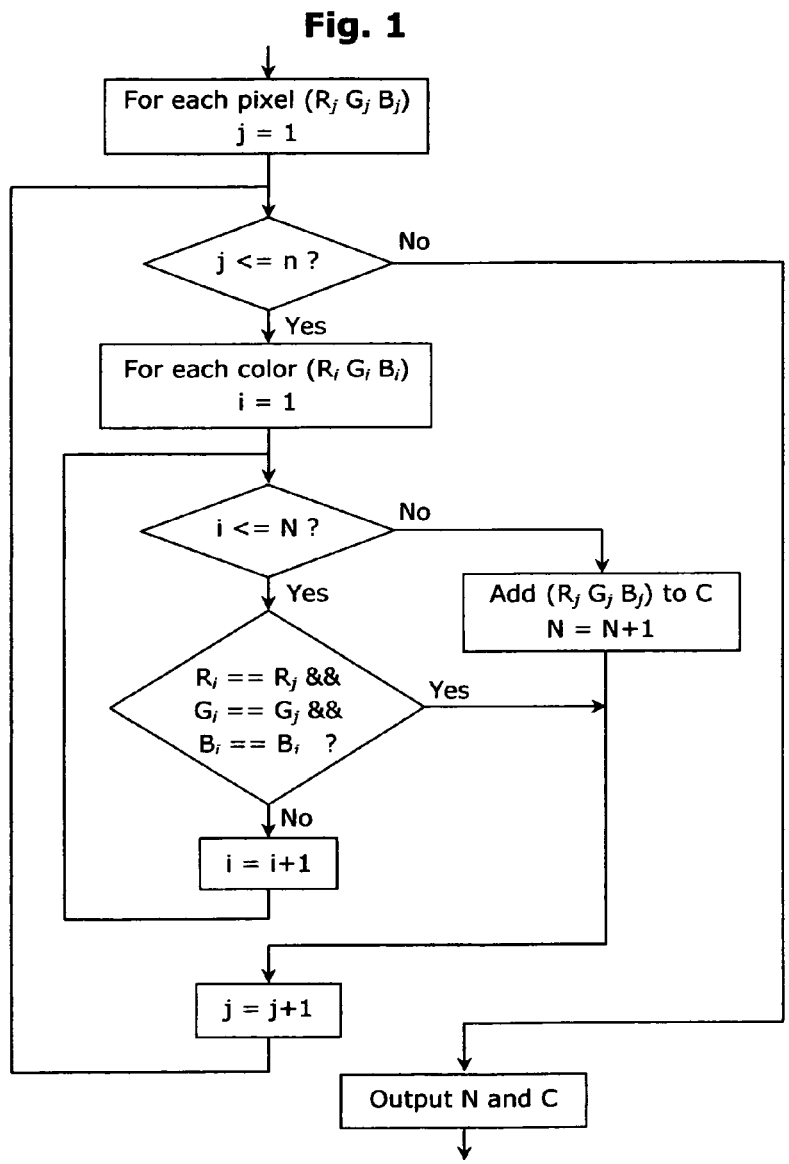
FIG. 1 presents Flow Chart A which sets forth the sequence of steps for building a color table C.

Optical scanners are well-known in the art and produce machine-readable data which are representative of a scanned object—e.g., a page of printed text. Most optical scanners employ line-focus systems in which light from an illuminated scan line on the object is imaged by a lens onto a linear photosensor array or detector positioned remotely from the object. The linear photosensor array is typically a single dimension array of photoelements that correspond to small area locations along the illuminated scan line. These small area locations are commonly referred to as "picture elements" or "pixels." Each photoelement produces a data signal that is representative of the intensity of light from the corresponding pixel. The data signals from the photoelements are received and processed by an appropriate data processing system which may subsequently store the data on a suitable medium or generate a display signal therefrom for reproducing an image of the object with a display device such as a CRT, LCD screen, or a printer.

The present invention is an optical scanning method in which the colored printed or depicted information (i.e., letters, words, pictures, drawings and/or designs of any kind or type) as well as the black & white printed or depicted information appearing on the individual page or upon multiple pages of a document are initially scanned via optical sensors and computer data processing systems in a full color, 24-bit per pixel mode; after which, the black & white wording and/or depictions are then selectively identified and electronically downsized via prepared in-advance computer programs to a minimal single bit per pixel value; and which, in combination with the retained 24-bit per pixel mode colored portion, are maintained as a single electronic file of markedly reduced size.

This unique method, which includes the selective identification and electronic downsizing of only the scanned black & white printed matter contents in a page or multi-page document, effectively retains and preserves the scanned printed information in its original form and appearance, while also maintaining the accuracy and integrity of the individual characters forming the colored written text and design portions of the page or document in their original 24-bit per pixel color format over the entirety of the single page or multi-page document.

This improved scanning methodology is preferably performed using one of several different techniques, each choice being a meaningful alternative to the others.

In a first instance, the process includes determining whether an individual page is entirely black & white in appearance; and if so, then converting the scanned printed matter contents of the entire black & white page into single bit per pixel value format using software programs prepared in advance for achieving this purpose. This instance pertains to and occurs most commonly with business letters, written manuscripts, and legal documents.

Alternatively, in a second instance and typically for individual pages that contain both colored informational portions and black & white informational portions in different sections—the improved method selectively identifies and determines which are the separate portions or sections of the page appearing as either black & white printed matter or as colored printed matter; and, after such determination, then selectively converts only the black & white content portions into single bit per pixel value from their scanned 24-bit per pixel colored format using computer programs prepared for performing this purpose. The down-sized black & white portion then existing in single bit per pixel value and the 24-bit per pixel mode colored portion are electronically held and maintained as the retained image, thereby markedly reducing the overall file storage size for the scanned page or multi-page document.

In a third instance, the process includes determining whether an individual page is entirely colored in appearance; and if so, then retaining and maintaining the entire scanned contents of the entirely colored page in their originally scanned 24-bit per pixel colored format. This instance is most frequently used and occurs most commonly with photographs, advertising and marketing materials, and business presentation reports and research marketing studies.

II. The Informational Processing System

The instant invention is intended to be used with conventionally available optical scanners and scanning systems; and utilizes an informational processing system which calculates, controls, and maintains certain color parameters electronically for maintaining a full color image in their originally scanned 24-bit per pixel format regardless of whether these colors appear as discrete letters, numbers, words, designs, and/or depictions. The present invention also concurrently selectively identifies and converts the letters, numbers, words, designs, and/or depictions appearing originally as black & white printed matter on the page into electronic images which are substantially reduced to a single bit per pixel format.

A. The on-Demand Conversion into Color Components

The processing and selective identification of colored portions of the printed matter content on a page or multi-page document is based on the following approach, all of which is prepared on-demand and which is then available for use after a page is optically scanned:

The operational premises are as follows: If two pixels, i and j, each has three color components—i.e., red, green and blue which may be separately represented as $(R_i, G_i, B_i)$ and $(R_j, G_j, B_j)$; and which have the same value for each corresponding color component—i.e., $R_i=R_j$ and $G_i=G_j$ and $B_i=B_j$; then there will be only one unique conversion color used in the processing of both these i and j pixels. Alternatively, if any of the individual color components $(R_i, G_i, B_i)$ and $(R_j, G_j, B_j)$ are different—i.e., $R_i \neq R_j$ or $G_i \neq G_j$ or $B_i \neq B_j$—then there will be two unique conversion colors used in the processing of these pixels, one conversion color for each of the two pixels.

Accordingly, by definition, all the pixels comprising the different color components identified as R, G, and B respectively will reflect this basis and conversion process. Thus, as merely one illustrative example suitable for two pixels: For converted "Black" pixels, R=0, G=0, and B=0; and for converted "White" pixels, R=255, G=255, and B=255.

B. Calculating and Controlling the Color Parameters

The manner of calculating and controlling the color parameters for the image processing system includes, but is not limited to:

(i) Listing the total number of unique colors separately within the color table C (e.g., each color contains red, blue and green components);
(ii) The average difference between the maximum and minimum hue values or intensity for each of the different color components; and
(iii) The average difference between any two hue values or intensities for each of the different color components.

C. The Building of an Analytical Color Table on-Demand

The on-demand building of a color table "C" is the mode and manner by which to account for all unique colors to be found in a colored page. The color table C will be built based on the scanned page. Different scanned pages therefore will have individual and different color tables.

The procedure for building an individual color table C starts with the first pixel and an empty color table chart. For every pixel to be analyzed, a loop will be called to compare its color components with each listed color in the color table until all pixels have been reviewed; and each pixel has been individually been analyzed and processed in full. This procedure is illustrated by Flow Chart A, presented as FIG. 1, below.

Note that via Flow Chart A (FIG. 1), for the very first pixel to be analyzed in this manner, the appropriate listing 6f representative component colors [represented herein by the different color components identified as R, G, and B respectively] must be made because the color table chart is initially empty. The completed analysis and input of data will result in the creation of a color table as illustratively shown below.

To demonstrate and elucidate the process, the following is provided.

Example 1:

when j = 1 (wherein j is the first pixel) and contains red, blue and green components, then color table C is prepared as follows.

| $R_1$ | $G_1$ | $B_1$ |
|---|---|---|
|  |  |  |
|  |  |  |
|  |  |  |

Example 2:

when j = 2
if $R_1 \neq R_2$,
or $G_1 \neq G_2$,
or $B_1 \neq B_2$,
then color table C is prepared as follows,

| $R_1$ | $G_1$ | $B_1$ |
|---|---|---|
| $R_2$ | $G_2$ | $B_2$ |
|  |  |  |
|  |  |  |

Otherwise, color table C will remain unchanged.

Example 3:

when j > 2
(N <= j <= n); and
if $R_j \neq$ any of $\{R_1, ..., R_N\}$,
or $G_j \neq$ any of $\{G_1, ..., G_N\}$,
or $B_j \neq$ any of $\{B_1, ..., B_N\}$,
then color table C is (N = N + 1) and is prepared as follows.

| ... | $R_1$ | $G_1$ | $B_1$ |
|---|---|---|---|
| ... | ... | ... | ... |
| ... | $R_N$ | $G_N$ | $B_N$ |
| | $R_j$ | $G_j$ | $B_j$ |

Otherwise, color table C will remain unchanged.

-continued

| $R_1$ | $G_1$ | $B_1$ | ... | $R_1$ | $G_1$ | $B_1$ |
|---|---|---|---|---|---|---|
|  |  |  | ... | ... | ... | ... |
|  |  |  | ... | $R_N$ | $G_N$ | $B_N$ |
|  |  |  |  |  |  |  |

Accordingly, following the technique and procedure of Flow Chart A (FIG. 1), the term "N" represents the total number of unique colors in the color table C. Consequently, if the color image has "n" pixels, then 1<=N<=n. The difference between any two hue values or intensities for any two colors is the absolute value of one color subtracted from the other.

It will be noted also that two extreme-limit cases are possible: The circumstance where all the pixels are one and the same color; and the instance where each individual pixel has its own distinctly different color.

D. Mathematical Calculations for Calculating the Value of the Color Components To calculate the average difference of maximum and minimum value for each color component in the color table, the process will use Equation I as stated below:

$$A_{MmM} = \frac{1}{N}\sum_{i=1}^{N}[\max(R_i, G_i, B_i) - \min(R_i, G_i, B_i)] \quad \text{(Equation I)}$$

wherein N is the total number of colors used in the image; max(a,b,c) and min(a,b,c) are the maximum and minimum values among a,b,c respectively; and R,G,B are three color components of a single color.

Similarly, the average difference of any two color components can be calculated by Equations II-IV respectively, as stated below.

$$A_{RmG} = \frac{1}{N}\sum_{i=1}^{N}[\text{abs}(R_i - G_i)] \quad \text{(Equation II)}$$

$$A_{RmB} = \frac{1}{N}\sum_{i=1}^{N}[\text{abs}(R_i - B_i)] \quad \text{(Equation III)}$$

$$A_{GmB} = \frac{1}{N}\sum_{i=1}^{N}[\text{abs}(G_i - B_i)] \quad \text{(Equation IV)}$$

wherein abs (v) is the absolute value of v.

E. A Working Example of a Color Table Prepared on-Demand

Given all of the foregoing, it is useful here to provide a working example of a color table prepared on-demand, and thereby demonstrate by representative illustration how the four average values are calculated.

The following color table is extracted from a sample scanned page having 16 unique colors—i.e., N=16 (the term "N" representing the total number of unique colors in the color table C). Each color value is individually listed in the columns R, G, and B for three color components, red, blue and green. Thus, in accordance with Equation I-IV described previously herein, the following is calculated:

$A_{MmM}=14.063, A_{RmG}=8.000, A_{RmB}=10.563,$ and $A_{GmB}=9.563$

On this basis, a color chart C was prepared on-demand as shown below.

|    | R   | G   | B   | MmM   | RmG  | RmB   | GmB  |
|----|-----|-----|-----|-------|------|-------|------|
| 1  | 75  | 84  | 80  | 9     | 9    | 5     | 4    |
| 2  | 166 | 170 | 134 | 36    | 4    | 32    | 36   |
| 3  | 179 | 185 | 188 | 9     | 6    | 9     | 3    |
| 4  | 112 | 122 | 118 | 10    | 10   | 6     | 4    |
| 5  | 213 | 220 | 216 | 7     | 7    | 3     | 4    |
| 6  | 130 | 137 | 140 | 10    | 7    | 10    | 3    |
| 7  | 248 | 250 | 248 | 2     | 2    | 0     | 2    |
| 8  | 99  | 109 | 108 | 10    | 10   | 9     | 1    |
| 9  | 198 | 206 | 177 | 29    | 8    | 21    | 29   |
| 10 | 193 | 200 | 197 | 7     | 7    | 4     | 3    |
| 11 | 166 | 174 | 170 | 8     | 8    | 4     | 4    |
| 12 | 129 | 139 | 132 | 10    | 10   | 3     | 7    |
| 13 | 90  | 100 | 95  | 10    | 10   | 5     | 5    |
| 14 | 142 | 150 | 147 | 8     | 8    | 5     | 3    |
| 15 | 191 | 206 | 234 | 43    | 15   | 43    | 28   |
| 16 | 229 | 236 | 219 | 17    | 7    | 10    | 17   |
| Average |  |  |  | 14.063 | 8.000 | 10.563 | 9.563 |

Thus, for this working example, with regard to color No. 4 ($R_4=112$, $G_4=122$, $B_4=118$), the following applies:

$\max(R_4, G_4, B_4) = \max(112, 122, 118) = 122;$ $\min(R_4, G_4, B_4) = \min(112, 122, 118) = 112;$ $MmM_4 = \max(R_4, G_4, B_4) - \min(R_4, G_4, B_4) = 122 - 112 = 10;$ $RmG_4 = abs(R_4 - G_4) = abs(112 - 122) = 10;$ $RmB_4 = abs(R_4 - B_4) = abs(112 - 118) = 6;$ $GmB_4 = abs(G_4 - B_4) = abs(122 - 118) = 4.$ For average difference values, the following also applies:

$A_{MmM} = (9+36+9+10+7+10+2+10+29+7+8+10+10+8+43+17)/16 = 14.063;$ $A_{RmG} = (9+4+6+10+7+7+2+10+8+7+8+10+10+8+15+7)/16 = 8.000;$ $A_{RmB} = (5+32+9+6+3+10+0+9+21+4+4+3+5+5+43+10)/16 = 10.563;$ $A_{GmB} = (4+36+3+4+4+3+2+1+29+3+4+7+5+3+28+17)/16 = 9.563.$

III. Identifying which are the Colored Portions and which are the Black & White Portions of an Optically Scanned Page Inside the computerized system, an optically scanned image is represented as a rectangular area, with each side of the rectangle being either horizontal or vertical. Given a color scanned page, and a grid where each internal cell has a certain pixel width and height (for example, a grid which is a quarter of an inch wide and a third of an inch high), an internal cell can be as small as a single pixel, or as large as an entire page.

The detection and selective identification technique starts with dividing the optically scanned page evenly into separate cells in a horizontal and vertical manner by using the prepared grid; and calculates the average values of each cell in the grid by using Equations I-IV as stated above, after building the color table of the cell via Flow Chart A (see FIG. 1). Then a merge procedure will combine the horizontal or vertical adjacent colored cells into bigger rectangular colored cells, and the average values of the new cell will be recalculated. The procedure ends with every colored cell in the grid being processed. After all the colored portions have detected and identified, the left over portions of the page are then deemed to be the black & white information present upon the scanned page.

Figure 2:
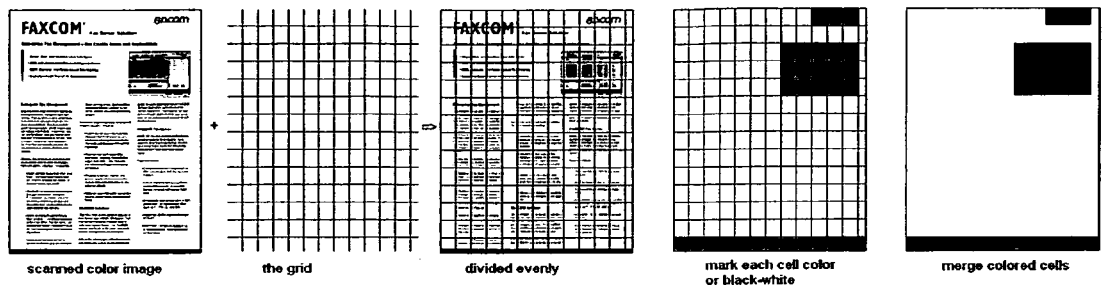
FIG. 2 presents a series of illustrations showing how a scanned image is separated into individual cells using a grid, how each cell is identified as being either colored or black & white, and how every horizontal or vertical adjacent cell is merged into a bigger colored rectangular cell.

The detection and selective identification technique is illustrated by FIG. 2 as a whole, which shows how the originally scanned image is separated into cells using a grid, how each separate cell is identified as being either colored or black & white, and how every horizontal or vertical adjacent cell is merged into a bigger colored rectangular cell. Also as shown by FIG. 2, the procedure demonstrates the three steps: The first is gridding; The second is identifying the individual cells as being either color or black & white; and the third is merging of adjacent color cells.

Please note also, a small portion of the grid-evaluated image may have same average color values as the original scanned color image has—which means the average values may not be changed by cutting the original scanned color image into small pieces.

IV. Reducing the Bit Per Pixel Value for the Selectively Identified Black & White Portions of Scanned Printed Matter By detecting and selectively identifying the black & white portions of the original image (text and/or depictions scanned in the 24-bit per pixel color mode) in the manner illustrated by FIG. 2, the instant methodology has set the controlling color parameters (as identified above) are used to find and accurately identify those portions of the scanned printed contents which are found to be less in value than the pre-set threshold requirements for colored printed matter. Once identified and selected, these sections of text and illustration found to be lesser in values are deemed to be the black & white portions of the originally scanned material; and these selectively identified portions of scanned information are then intentionally reduced in bit per pixel value to a fixed threshold requirement of 1 bit per pixel.

Figure 3:
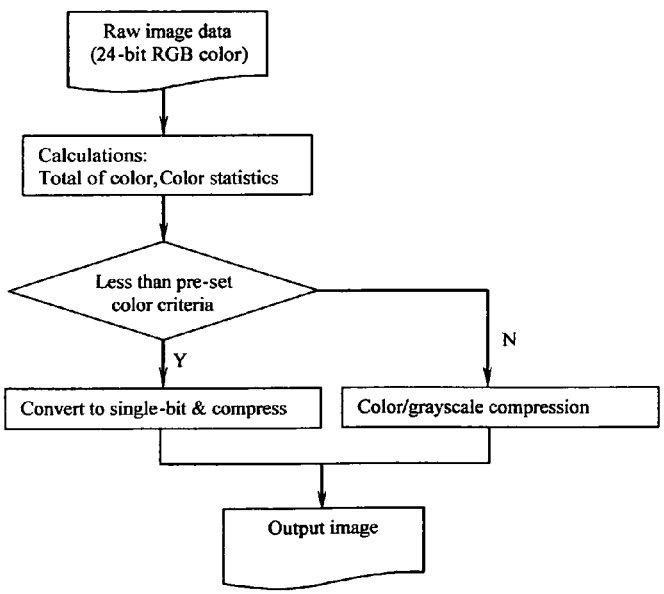
FIG. 3 presents Flow Chart B which sets forth the sequence of steps comprising the invention as a whole.
Figure 4:
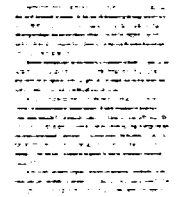
FIG. 4 presents Table 1 which sets forth empirical data demonstrating the functions and capabilities of the invention.
Figure 4:
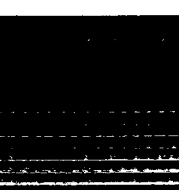
Figure 4:
Figure 4:
Figure 4:

In addition, to improve the success rate for the reduced bit per pixel images representing the scanned black & white printed content, the quality of the initially received scanned characters can be enhanced by use of an image histogram to eliminate (or at least substantially diminish) the background noise of the scanned images. Thus, after their conversion into a single bit per pixel of color, the image quality of the reduced-bit per pixel characters is then preferably enhanced using anti-alias technology to restore a crisp quality for the single-bit per pixel color images. The overall sequence of steps constituting the methodology as a whole is illustrated by Flow Chart B, presented as FIG. 3 herein.

The processing system illustrated by Flow Chart B (FIG. 3) employs the 24-bit RGB raw color image as the input of the scan. The process system then extracts the color table used in creating the scanned color image. After such extraction, the system calculates the average difference of maximum and minimum values for each color component in the color table, as well as calculates the average difference between any two values for each color image. Finally, the scanned image will be converted and reduced in bit value to the single-bit per pixel level if and when the average color component values for that image are less than the pre-set color threshold requirements. Desirably, after being converted, the single-bit per pixel image will be compressed and stored as TIFF G4 data stream for the smaller file size and higher compression ratio, and to meet the industry standard, such as that used for facsimile transmissions.

In comparison, those scanned images meeting or exceeding the pre-set color value threshold requirements are recognized as being colored original printed matter; and these are selectively retained and maintained in their scanned 24 bit per pixel, colored image format.

V. Particular Features Provided by the Invention

Advantages and Benefits

Reducing scanned image size will save storage space on the computer, speed up the printing, delivering and displaying of the image, and save color toner when printing.

Features and Capabilities

The invention is intended to employed and be used as a software procedure, independent from the scanner and other hardware. Equally important, programmed software is much easier to be changed and upgraded, can be done even online, to reduce cost.

Satisfaction of a Long Standing Need

Reducing some or all of an optically scanned image to single-bit pixel value for only the black & white portions is to truly duplicate the original document. The desire for generating smaller electronic files for scanned documents fulfills a long recognized need and constitutes a substantial achievement.

VI. Evidentiary Support and Empirical Data

A. The Performance Tests

A series of performance tests were conducted to demonstrate the functions and the capabilities of the instant method. These tests were made in accordance with the procedure set forth above; and the resulting data is given by Table 1, presented as FIG. 3 herein. The data of Table 1 also provides test results which empirically demonstrate the performance qualities of the method and system.

For test purposes, the pre-selected color values were:

$$A_{MmM}=20.0; \text{ and } A_{RmG}=A_{RmB}=A_{GmB}=15.0.$$

In actual fact and practice, the colored portion of a scanned text typically has higher average differential values, while the black & white portion of the scanned text has lower differential values. One of the extreme exemplary instances is a colored page wherein every pixel has different color—as is shown by Image No. 2 in Table 1. The corresponding average values are: $A_{MmM}=128.0$; and $A_{RmG}=A_{RmB}=A_{GmB}=85.332$.

Further testing also showed that: (a) For a color photo, the average values are around 30 to 45 (as shown by Image No. 5); and (b) For a scanned text document (as shown by Image No. 3), the values are around 15; and (c) For some scanned text documents, the values are sometimes below 10 (as shown by Image No. 1). Therefore, by using average values preselected as described above, any given portion of image in the scanned page can be selectively identified as being either colored or black & white very easily.

In addition, it will be noted and appreciated that, via the data of Table 1 (FIG. 3)—by comparing the color extractions with the above-given values, the black & white portions of the scanned printed matter are selectively identified and separable from the colored portions of the same scanned text. Thus, Image No. 1 and Image No. 3 are recognized as being black & white information images in their original context—i.e., black & white printed matter appearing on the face of a page. Consequently, only the scanned texts of Image No. 1 and Image No. 3 are then reduced and converted into single-bit per pixel format as an electronic file of markedly reduced size.

In comparison, via the data of Table 1, Image No. 2 is recognized as being a completed colored page; while Image No. 4 is recognized as being an example of scanned page containing both colored and black & white portions.

B. The Speed Tests

Since the mathematical calculation set forth above deals with each and every pixel of the whole image, the speed of the method becomes the essential limitation factor for the processing system as a whole.

The following are the performance results of a speed test conducted by using a Pentium P4 2.2 GHz computer running Windows XP SP2 as the operating system. The speed test itself is conducted in accordance with the procedure described in Cowlishaw, M. F., "Fundamental requirements for picture presentation", *Proc. Society for Information Display* 26 (2): 101-107 (1985); and CCITT Blue Book, Recommendations T.0-T.63, ISBN 92-61-03611-2.

Speed Test Details

In accordance with Flow Chart A (FIG. 1), the proper building of a color table must deal with every pixel. Therefore, the processing time is constant for a given page size and typically is the same as the time needed for image conversion. For a letter-sized color page (8.5 by 11 inches in 200 DPI), the time required for programmed software to get the color count and obtain data from the prepared color table is 0.18 seconds using the computer mentioned above; and the time required to convert the scanned image to a single bit per pixel is 0.12 seconds.

The present invention is not to be restricted in form nor limited in scope except by the claims appended hereto.

What we claim is:

1. A method for electronically scanning and storing the contents of an individual page having a colored portion and a black & white portion of printed matter as a single electronic file of markedly reduced size, said scanning method comprising the steps of:

obtaining the entire printed matter contents of an individual page as scanned data in a 24-bit per pixel mode;

selectively identifying from the scanned 24-bit per pixel entire printed matter contents which is a colored portion and which is a black & white portion using a prepared grid and analytical color table;

downsizing only said selectively identified black & white portion of said scanned 24-bit per pixel entire printed matter contents to a single bit per pixel format;

concurrently retaining said selectively identified colored portion of said scanned entire printed matter contents in the 24-bit per pixel mode; and maintaining said downsized black & white portion in the single bit per pixel format together with said colored portion in the 24-bit per pixel mode as a single electronic file of markedly reduced size.

2. The method as recited in claim 1 wherein said selective identification of which is the colored portion and which is the black & white portion of said scanned 24-bit per pixel entire printed matter contents comprises calculating and controlling the color component parameters of said scanned entire printed matter contents using the analytical color table.

3. The method as recited in claim 1 wherein said selective identification of which is the colored portion and which is the black & white portion of said scanned 24-bit per pixel entire printed matter contents using a prepared grid and analytical color table further comprises separately identifying an average value for all of the different color components constituting a color in said scanned entire printed matter contents;

measuring the average difference between the maximum and minimum values for all of said different color components; and determining the average difference between any two values for all of said different color components.

4. A method for electronically scanning and storing the contents of each individual page in a multiple page document which has at least one colored portion and at least one black & white portion of printed matter as one electronic file of markedly reduced size, said scanning method comprising the steps of:

obtaining the entire printed matter contents of each individual page constituting the multiple page document as scanned data in a 24-bit per pixel mode;

selectively identifying from the scanned 24-bit per pixel entire printed matter contents of each individual page in the multiple page document which is a colored portion and which is a black & white portion using a prepared grid and analytical color table;

downsizing only said selectively identified black & white portion of said scanned 24-bit per pixel entire printed matter contents of each individual page of the multiple page document to a single bit per pixel format;

concurrently retaining said selectively identified colored portion of said scanned entire printed matter contents of each individual page of the multiple page document in said 24-bit per pixel mode; and maintaining said downsized black & white portion in the single bit per pixel format together with said colored portion in the 24-bit per pixel mode for each individual page of the multiple page document as one electronic file of markedly reduced size.

* * * * *